(12) United States Patent
Petkov et al.

(10) Patent No.: US 8,866,498 B2
(45) Date of Patent: Oct. 21, 2014

(54) SURFACE CHARGE REDUCTION TECHNIQUE FOR CAPACITIVE SENSORS

(75) Inventors: Vladimir Petkov, Mountain View, CA (US); Ganesh Balachandran, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 494 days.

(21) Appl. No.: 13/220,457

(22) Filed: Aug. 29, 2011

(65) Prior Publication Data

US 2013/0049774 A1 Feb. 28, 2013

(51) Int. Cl.
*G01R 27/26* (2006.01)
*G01P 15/125* (2006.01)
*G01D 5/24* (2006.01)

(52) U.S. Cl.
CPC .............. *G01D 5/24* (2013.01); *G01P 15/125* (2013.01)
USPC .......................................... 324/679; 324/667

(58) Field of Classification Search
USPC ................................................. 324/660–662
See application file for complete search history.

(56) References Cited

U.S. PATENT DOCUMENTS

| 2005/0218911 A1* | 10/2005 | Denison | 324/661 |
| 2007/0029629 A1 | 2/2007 | Yazdi | |
| 2008/0100486 A1* | 5/2008 | Lin | 341/143 |

FOREIGN PATENT DOCUMENTS

| WO | 2005101030 A1 | 10/2005 |
| WO | 2006074119 A1 | 7/2006 |
| WO | 2009038924 A2 | 3/2009 |

* cited by examiner

*Primary Examiner* — Vincent Q Nguyen
(74) *Attorney, Agent, or Firm* — Maginot, Moore & Beck (57) ABSTRACT

A differential capacitive transducer system is disclosed that includes first and second capacitive cores and a chopping system. The first core a first input coupled to a first capacitor, a second input coupled to a second capacitor, and a first output. The second core includes a third input coupled to a third capacitor, a fourth input coupled to a fourth capacitor, and a second output. The chopping system has first and fourth inputs coupled to positive signals, and second and third inputs coupled to negative signals. As the chopping system switches between high and low states, it couples the core inputs to different polarity signals reducing charge buildup. The different polarity signals can have substantially same magnitudes. Chopper clock and main clock frequencies can be selected to provide substantially zero average voltages at the core inputs. The system can include an integrator circuit and differential summing circuits.

20 Claims, 7 Drawing Sheets

SURFACE CHARGE REDUCTION TECHNIQUE FOR CAPACITIVE SENSORS

BACKGROUND OF THE INVENTION

This patent relates to capacitive transducers, and more particularly to techniques for reducing surface charge build-up in capacitive transducers.

Transducers convert a general physical quantity (for example, acceleration, pressure, etc.) to quantities that can be processed by electronic circuits. In particular, capacitive transducers produce a change of capacitance, corresponding to the magnitude of the measured input signal. Readout circuits for capacitive transducers transform the capacitance change produced by the transducer to an electrical signal. In the process, the circuits apply voltage waveforms to the transducer electrodes.

Figure 1:
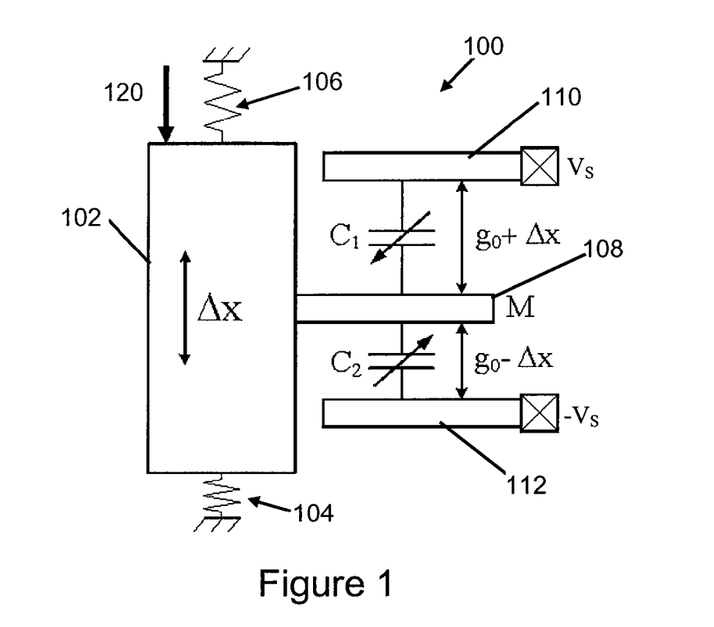
FIG. 1 illustrates an exemplary embodiment of a mechanical sensing element of a capacitive transducer.

A capacitive accelerometer, a capacitive transducer for measuring acceleration, includes a mechanical sensing element and a readout circuit. FIG. 1 illustrates an exemplary embodiment of a mechanical sensing element 100 of a capacitive accelerometer. In this embodiment, the mechanical sensing element 100 includes a mass 102 suspended between a first spring 104 and a second spring 106, a first electrode 110 and a second electrode 112. A proximal end of the mass 102 is coupled to the first spring 104 and a distal end of the mass 102 is coupled to the second spring 106. The first spring 104 has two ends; a first end coupled to the proximal end of the mass 102 and a second end coupled to a substrate. The second spring 106 has two ends; a first end coupled to the distal end of the mass 102 and a second end coupled to the substrate. A common electrode M is coupled to the mass 102 and moves with the mass 102 relative to the substrate. The first and second electrodes 110, 112 are stationary relative to the substrate. In this embodiment a positive reference voltage $V_S$ is applied to the first electrode 110 and the negative reference voltage $-V_S$ is applied to the second electrode 112. A first variable capacitor $C_1$ is formed between the first electrode 110 and the common electrode M, and a second variable capacitor $C_2$ is formed between the second electrode 112 and the common electrode M.

In this embodiment, when the system is at rest, there is a substantially equal nominal gap $g_0$ between the first electrode 110 and the common electrode M and between the second electrode 112 and the common electrode M, creating substantially equal capacitances in the first variable capacitor $C_1$ and the second variable capacitor $C_2$. An input acceleration moves the mass 102 relative to the substrate which varies the gaps between the electrodes and varies the capacitance of the variable capacitors $C_1$, $C_2$. Acceleration in the direction of arrow 120 deflects the mass 102 a distance $\Delta x$ that is proportional to the input acceleration. This movement of the mass 102 increases the distance between the first electrode 110 and the common electrode M to $g_0+\Delta x$, and decreases the distance between the second electrode 112 and the common electrode M to $g_0-\Delta x$, which changes the capacitance of capacitors $C_1$ and $C_2$. The capacitance C of variable capacitors $C_1$ and $C_2$ can be determined by:

$$C_{1/2} = \frac{\varepsilon_0 A}{g_0 \pm \Delta x} \quad (1)$$

where $\varepsilon_0$ is dielectric permittivity, A is the area of the capacitive plates (which extend into the paper), $g_0$ is the nominal gap and $\Delta x$ is the displacement due to the acceleration. The readout circuit determines the value of $\Delta x$ based on the capacitance change in capacitors $C_1$ and $C_2$.

Figure 2:
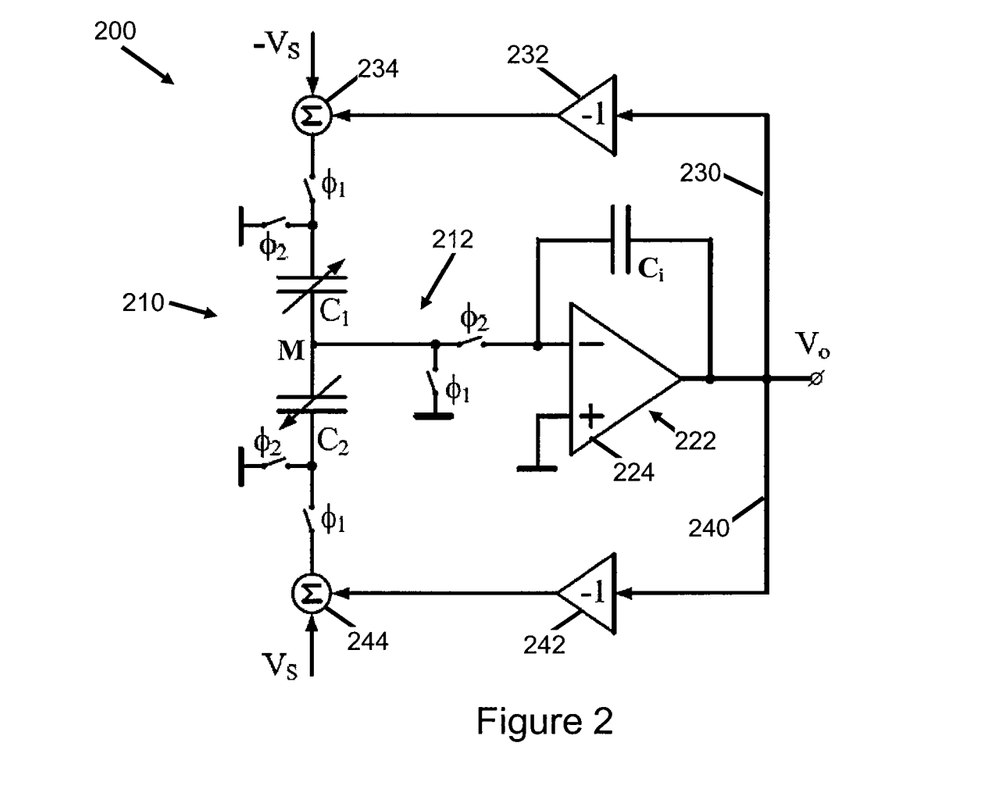
FIG. 2 is a schematic of an exemplary embodiment of a single-ended self-balancing capacitive bridge.

FIG. 2 is a schematic of an exemplary embodiment of a self-balancing capacitive bridge 200. The switched-capacitor implementation shown in FIG. 2 has the advantage of straightforward DC biasing of the input without the need for a high resistance path, as well as a stable and well-defined transfer function over process and temperature. It also provides a discrete-time output signal, which can be digitized directly by an analog-to-digital converter (ADC). FIG. 2 shows a single-ended embodiment of a self-balancing bridge.

The self-balancing bridge 200 includes a sensor core and a readout or interface circuit. The sensor core 210 represents a capacitive sensor element, for example the sensing element 100 shown in FIG. 1 or one of various other capacitive sensor elements known in the art. The sensor core 210 includes two variable capacitors, $C_1$ and $C_2$, sharing a common node M that is coupled to the output of the sensor core 210. The readout circuit includes a forward path that passes the output of the sensor core 210 through an integrator 222, which provides gain, to the output $V_O$. In this embodiment, the integrator 222 includes an amplifier 224 with an integrating capacitor $C_i$. The self-balancing bridge 200 also includes a first feedback path 230 and a second feedback path 240 that feedback the output voltage $V_o$ to the sensor core 210. The first feedback path 230 feeds back the output voltage $V_o$ through a first inverting amplifier 232 to a first summing node 234. The first summing node 234 sums the inverted output voltage $-V_0$ and inverted reference voltage $-V_S$, and outputs the resulting voltage $-V_S-V_0$ to the first variable sensor capacitor $C_1$. The second feedback path 240 feeds back the output voltage $V_o$ through a second inverting amplifier 242 to a second summing node 244. The second summing node 244 sums the inverted output voltage $-V_0$ and reference voltage $V_S$, and outputs the resulting voltage $V_S-V_0$ to the second variable sensor capacitor $C_2$.

The self-balancing bridge 200 tries to equalize the absolute charge on the two sensor capacitors, $C_1$ and $C_2$. Under these conditions the output voltage is proportional to the ratio between the difference and the sum of the measured capacitors:

$$V_o = -V_S \frac{C_1 - C_2}{C_1 + C_2} \quad (2)$$

Measuring the above ratio is of interest for a variety of applications, acceleration sensors being only one particular example.

Figure 3:
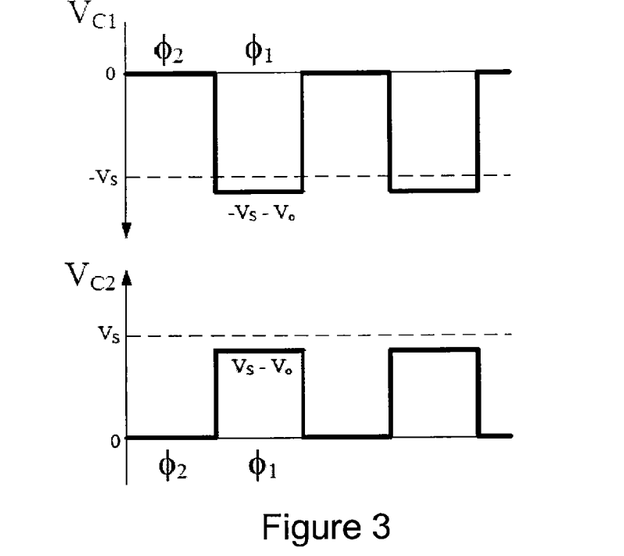
FIG. 3 shows exemplary voltage waveforms on the bridge capacitors of FIG. 2.

FIG. 3 shows the voltage waveforms across the bridge capacitors $C_1$ and $C_2$ of FIG. 2. It is apparent that both $V_{C1}$, the voltage across capacitor $C_1$, and $V_{C2}$, the voltage across capacitor $C_2$, have non-zero average values. It is well-known that applying voltage waveforms with non-zero average values across pairs of electrodes in a micro-machined transducer leads to a build-up of surface charge, which disturbs the operation of the system. One particular consequence of surface-charge build-up is a drift of the DC offset, which is an important parameter in a number of applications.

A second disadvantage of the readout circuit in FIG. 2 is that the signal is transferred to the input of the amplifier through a single signal line 212. It is also generally known that such "single-ended" implementations are susceptible to unwanted interference. Differential signaling is the standard solution to this problem as shown in FIG. 4.

Figure 4:
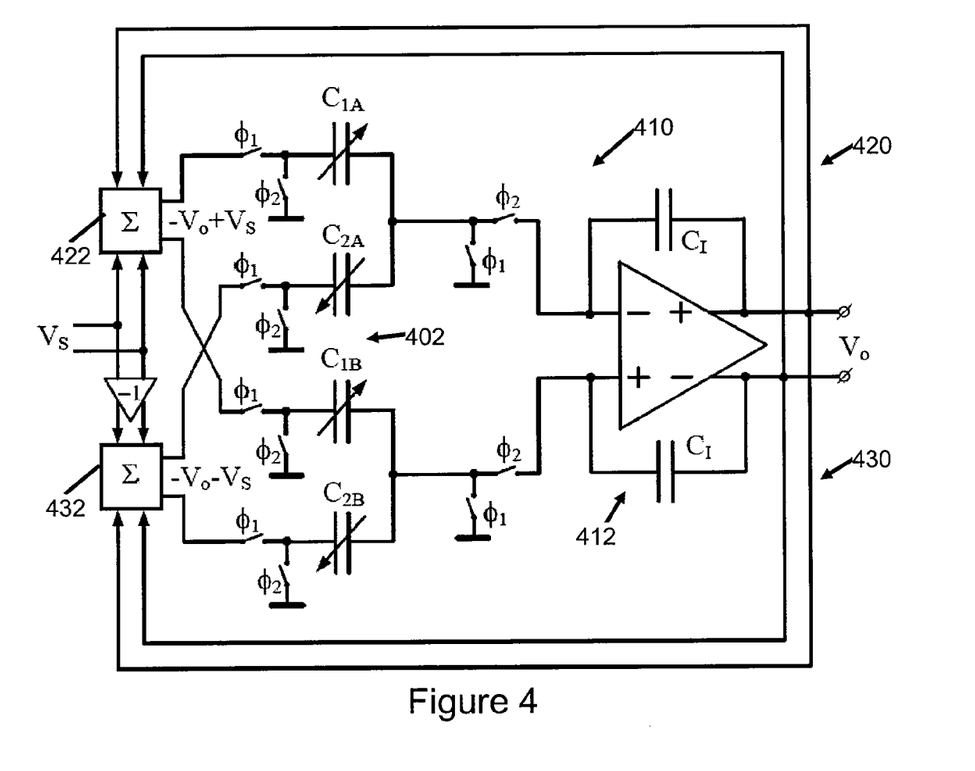
FIG. 4 is a schematic of an exemplary embodiment of a differential self-balancing capacitive bridge.

FIG. 4 shows an exemplary embodiment of a differential self-balancing capacitive bridge system 400. The differential system 400 includes a sensing element 402, a dual forward path 410 and two dual feedback paths 420, 430. In the differential system 400, the transducer 402 is implemented as two separate cores, a first core $C_A$ and a second core $C_B$. The first core $C_A$ includes variable capacitors $C_{1A}$ and $C_{2A}$ that share a common node coupled to the output of the first core $C_A$. The second core $C_B$ includes variable capacitors $C_{1B}$ and $C_{2B}$ that share a common node coupled to the output of the second core $C_B$. The corresponding capacitors of the two cores react to the input signal in a substantially identical way (i.e., $C_{1A}=C_{1B}$ and $C_{2A}=C_{2B}$). However, the electrical signals processed by the two cores have opposite polarity. In such designs any external interference appears as a "common-mode" signal and is rejected by the readout circuit.

The forward path 410 takes the output signals from both cores of the sensing element 402, passes them through an integrator 412 and produces an output signal $V_0$. The first feedback path 420 feeds back the output signal $V_0$ to a first summing node 422. The first summing node 422 inverts the output signal and sums it with a positive reference voltage $V_S$ to generate a first summation signal $-V_0+V_S$, where voltage $(-V_0+V_S)/2$ is provided to capacitor $C_{1A}$ of the first core $C_A$ and voltage $-(-V_0+V_S)/2$ is provided to capacitor $C_{1B}$ of the second core $C_B$. The second feedback path 430 feeds back the output signal $V_0$ to a second summing node 432. The second summing node 432 inverts the output signal and sums it with the inverted reference voltage $-V_S$ to generate a second summation signal $-V_0-V_S$, where voltage $(-V_0-V_S)/2$ is provided to capacitor $C_{2A}$ of the first core $C_A$ and voltage $-(-V_0-V_S)/2$ is provided to capacitor $C_{2B}$ of the second core $C_B$.

Figure 5:
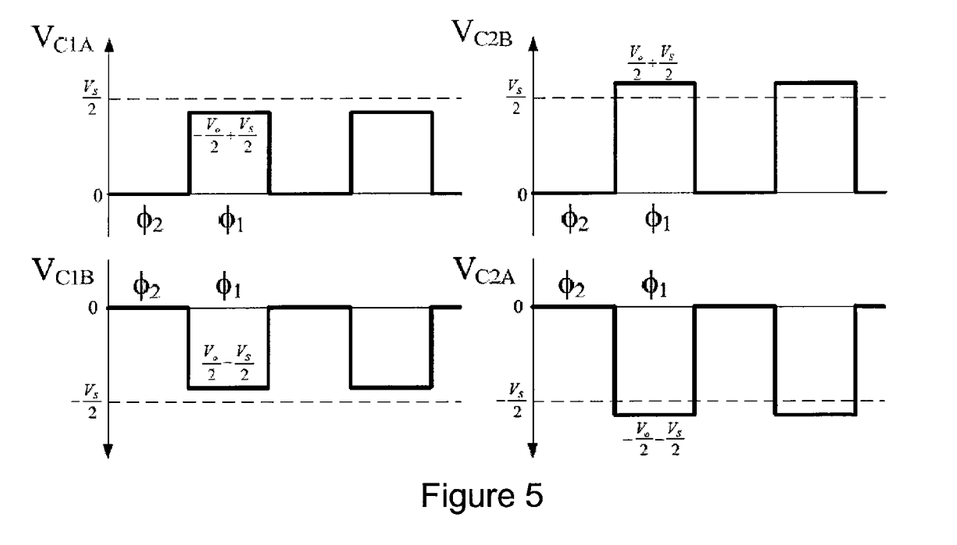
FIG. 5 shows exemplary voltage waveforms on the bridge capacitors of FIG. 4.

FIG. 5 shows the voltage waveforms across the bridge capacitors of the transducer core 402 for the differential system 400 in FIG. 4. It is once again apparent that the waveforms have a non-zero average value, hence the surface charging problem persists in the differential implementation as well.

It would be desirable to have a substantially zero average voltage across the electrodes in the transducer to reduce surface charge build-up which would reduce drift in DC offset.

SUMMARY OF THE INVENTION

A differential capacitive transducer system that senses a physical quantity is disclosed that includes first and second capacitive cores and a chopping system. The first and second capacitive cores generate first and second core outputs, respectively, based on the physical quantity. The first capacitive core includes a first variable capacitor, a second variable capacitor, a first core input coupled to the first variable capacitor, a second core input coupled to the second variable capacitor, and a first core output coupled to a first common node between the first variable capacitor and the second variable capacitor. The second capacitive core includes a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor. The chopping system has a high state and a low state and is coupled to the first and second capacitive cores. The chopping system has a first chopping input coupled to a first positive signal, a second chopping input coupled to a second negative signal, a third chopping input coupled to a first negative signal, a fourth chopping input coupled to a second positive signal, a first chopping output and a second chopping output.

When the chopping system is in the high state, the first chopping input is coupled to the first core input, the second chopping input is coupled to the second core input, the third chopping input is coupled to the third core input, the fourth chopping input is coupled to the fourth core input, the first chopping output is coupled to the first core output and the second chopping output is coupled to the second core output. When the chopping system is in the low state, the first chopping input is coupled to the third core input, the second chopping input is coupled to the fourth core input, the third chopping input is coupled to the first core input, the fourth chopping input is coupled to the second core input, the first chopping output is coupled to the second core output and the second chopping output is coupled to the first core output. The first positive signal can have substantially the same magnitude and the opposite polarity as the first negative signal, and the second negative signal can have substantially the same magnitude and the opposite polarity as the second positive signal.

The differential capacitive transducer system can also include an integrator circuit that receives the first and second core outputs and generates a transducer signal. The differential capacitive transducer system can also include first and second differential summing circuits. The first differential summing circuit sums the transducer signal with a reference voltage and generates the first positive signal and the first negative signal. The second differential summing circuit sums the transducer signal with an inverted reference voltage and generates the second positive signal and the second negative signal. The reference voltage and the inverted reference voltage have substantially the same magnitude and opposite polarity. The differential capacitive transducer system can also include a first feedback path that feeds back the transducer signal to the first differential summing circuit, and a second feedback path that feeds back the transducer signal to the second differential summing circuit.

The first variable capacitor and the third variable capacitor can react substantially the same to the physical quantity, and the second variable capacitor and the fourth variable capacitor can react substantially the same to the physical quantity. The first capacitive core can include a first stationary capacitive plate, a second stationary capacitive plate, a first movable capacitive plate and a second movable capacitive plate, where the first movable capacitive plate is coupled to the second movable capacitive plate; the first variable capacitor is formed by the first stationary capacitive plate and the first movable capacitive plate; and the second variable capacitor is formed by the second stationary capacitive plate and the second movable capacitive plate. The second capacitive core can include a third stationary capacitive plate, a fourth stationary capacitive plate, a third movable capacitive plate and a fourth movable capacitive plate, where the third movable capacitive plate is coupled to the fourth movable capacitive plate; the third variable capacitor is formed by the third stationary capacitive plate and the third movable capacitive plate; and the fourth variable capacitor is formed by the fourth stationary capacitive plate and the fourth movable capacitive plate. The first movable capacitive plate can be coupled to the third movable capacitive plate.

The differential capacitive transducer system can also include a main clock having a main clock frequency and a chopping clock having a chopping clock frequency. The main clock can control the charging and discharging of the first and second capacitor cores, and the chopping clock can control when the chopping system is in the high state and the low state. The main clock frequency and the chopping clock frequency can be selected to cause the average voltage over time to be substantially zero volts at each of the first core input, the second core input, the third core input and the fourth core input. The main clock frequency can be twice the chopping clock frequency.

A capacitive transducer system that senses a physical quantity is described that includes first and second capacitive cores, and a chopping system that oscillates between a high state and a low state coupled to the first and second capacitive cores. The first and second capacitive cores generate first and second core outputs, respectively. The first capacitive core includes a first variable capacitor, a second variable capacitor, a first core input coupled to the first variable capacitor, a second core input coupled to the second variable capacitor, and a first core output coupled to a first common node between the first variable capacitor and the second variable capacitor. The second capacitive core includes a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor. When the chopping system is in the low state, a first high input of the first and second core inputs receives a positive voltage and a first low input of the first and second core inputs receives a negative voltage, and a second high input of the third and fourth core inputs receives a positive voltage and a second low input of the third and fourth core inputs receives a negative voltage. The first high input and the first low input are different inputs, and the second high input and the second low input are different inputs. When the chopping system is in the high state, the first high input receives a negative voltage and the first low input receives a positive voltage, the second high input receives a negative voltage and the second low input receives a positive voltage. When the chopping system is in the low state, the first high input and the first low input can be coupled to output signals based on the first and second core outputs, the second high input can be coupled to a positive reference voltage, and the second low input can be coupled to a negative reference voltage. The negative reference voltage has substantially the same magnitude and the opposite polarity as the positive reference voltage. When the chopping system is in the low state, the first high input can be coupled to the negative reference voltage, the first low input can be coupled to a positive reference voltage, and the second high input and the second low input can be coupled to the output signals. The capacitive transducer system can also include an integrator circuit that has an inverting input and a non-inverting input. The integrator circuit can generate the output signals. The first core output can be coupled to the inverting input of the integrator, and the second core output can be coupled to the non-inverting input of the integrator.

A differential capacitive transducer system that senses a physical quantity is described that includes first and second capacitive cores, a chopping system, output circuitry, a main clock and a chopping clock. The first and second capacitive cores generate first and second core outputs, respectively, based on the physical quantity. The first capacitive core includes a first variable capacitor, a second variable capacitor, a first core input coupled to the first variable capacitor, a second core input coupled to the second variable capacitor, and a first core output coupled to a first common node between the first variable capacitor and the second variable capacitor. The second capacitive core includes a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor. The chopping system has a high state and a low state, and is coupled to the first and second capacitive cores, the chopping system includes a first chopping input coupled to a first positive signal, a second chopping input coupled to a second negative signal, a third chopping input coupled to a first negative signal, a fourth chopping input coupled to a second positive signal, a first chopping output and a second chopping output. The output circuitry receives the first and second core outputs and generates a transducer signal. The main clock has a main clock frequency, and controls the charging and discharging of the first and second capacitor cores. The chopping clock has a chopping clock frequency, and controls when the chopping system is in the high state and the low state. When the chopping system is in the high state, the first chopping input is coupled to the first core input, the second chopping input is coupled to the second core input, the third chopping input is coupled to the third core input, the fourth chopping input is coupled to the fourth core input, the first chopping output is coupled to the first core output and the second chopping output is coupled to the second core output. When the chopping system is in the low state, the first chopping input is coupled to the third core input, the second chopping input is coupled to the fourth core input, the third chopping input is coupled to the first core input, the fourth chopping input is coupled to the second core input, the first chopping output is coupled to the second core output and the second chopping output is coupled to the first core output. The first positive signal can have substantially the same magnitude and the opposite polarity as the first negative signal, and the second negative signal can have substantially the same magnitude and the opposite polarity as the second positive signal. The main clock frequency and the chopping clock frequency can be selected to cause the average voltage over time to be substantially zero volts at each of the first core input, the second core input, the third core input and the fourth core input. The main clock frequency can be twice the chopping clock frequency.

The differential capacitive transducer system can also include first and second differential summing circuits. The first differential summing circuit sums the transducer signal with a reference voltage and generates the first positive signal and the first negative signal. The second differential summing circuit sums the transducer signal with an inverted reference voltage and generates the second positive signal and the second negative signal, the reference voltage and the inverted reference voltage having substantially the same magnitude and opposite polarity. The first variable capacitor and the third variable capacitor can react substantially the same to the physical quantity, and the second variable capacitor and the fourth variable capacitor can react substantially the same to the physical quantity.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

Figure 6:
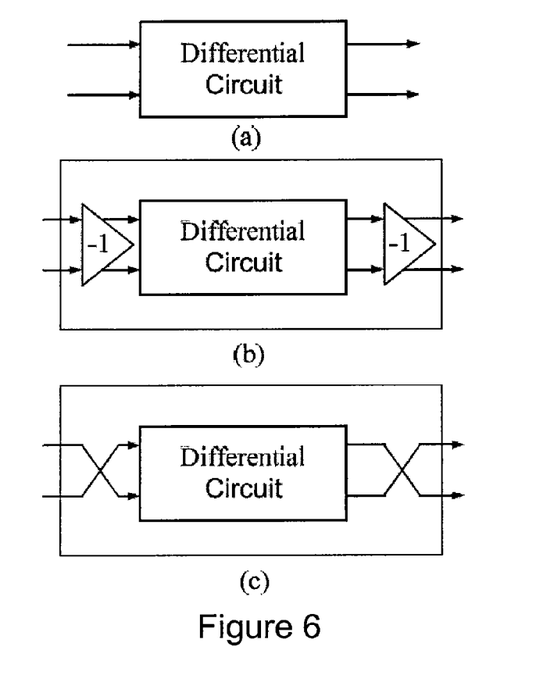
FIG. 6 depicts three variations of the terminals of a differential circuit: (a) represents nominal direct terminal connections, (b) represents inverted terminal connections, and (c) represents swapped terminal connections.

FIG. 6 represents a top-level view of three variations of a differential circuit, for example the differential circuit of FIG. 4. FIG. 6(a) represents the differential circuit as shown in FIG. 4, which as explained above has a non-zero average voltage across the electrodes in the transducer 402. FIG. 6(b) represents the differential circuit as shown in FIG. 4 with the bridge capacitor inputs inverted. This only reverses the polarity of the voltage waveforms on the bridge capacitors, which does nothing to reduce the non-zero average voltage across the electrodes. FIG. 6(c) represents the differential circuit as shown in FIG. 4 with the inputs to the bridge capacitors swapped. This only moves the voltage waveform from core $C_A$ to core $C_B$ and moves the voltage waveform from core $C_B$ to $C_A$, which also does nothing to reduce the non-zero average voltage across the electrodes. In essence, all three circuits in FIG. 6 are the same. It would be desirable to design a circuit that has a substantially zero average voltage across the electrodes in the transducer to reduce surface charge build-up and reduce drift in DC offset.

Figure 7:
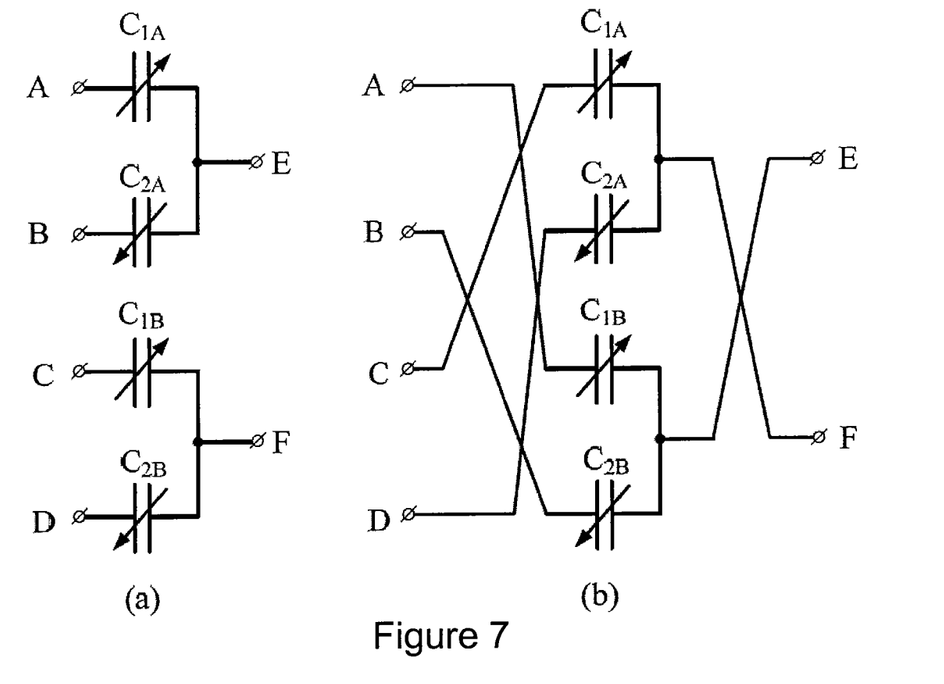
FIG. 7 shows more detailed diagrams of nominal direct terminal connections and swapped terminal connections for a differential circuit.

FIGS. 7(a) and 7(b) show the two separate cores $C_A$ and $C_B$ of a differential system with each core having two variable capacitors. Core $C_A$ includes variable capacitors $C_{1A}$ and $C_{2A}$, and core $C_B$ includes variable capacitors $C_{1B}$ and $C_{2B}$. The corresponding capacitors of the two cores react to the input signals in a substantially identical way (i.e., $C_{1A}=C_{1B}$ and $C_{2A}=C_{2B}$) and move in the same direction due to a transducer input. For example when an accelerometer like the one shown in FIG. 1 experiences an acceleration input, the common electrode for core $C_A$ and the common electrode for core $C_B$ both move in the same direction. However, the electrical signals processed by the two cores have opposite polarity. FIGS. 7(a) and 7(b) show four inputs A, B, C and D to the cores; and two outputs E and F from the cores.

FIG. 7(a) shows the nominal direct connection used by the circuit in FIG. 4 and depicted in FIG. 6(a). In the configuration of FIG. 7(a), variable capacitor $C_{1A}$ is coupled to input A, variable capacitor $C_{2A}$ is coupled to input B, variable capacitor $C_{1B}$ is coupled to input C, variable capacitor $C_{2B}$ is coupled to an input D, variable capacitors $C_{1A}$ and $C_{2A}$ share a common node that is coupled to output E, and variable capacitors $C_{1B}$ and $C_{2B}$ share a common node that is coupled to an output F.

FIG. 7(b) shows the swapped connections depicted in FIG. 6(c). In the configuration of FIG. 7(b), variable capacitor $C_{1A}$ is coupled to input C, variable capacitor $C_{2A}$ is coupled to input D, variable capacitor $C_{1B}$ is coupled to input A, variable capacitor $C_{2B}$ is coupled to an input B, variable capacitors $C_{1A}$ and $C_{2A}$ share a common node that is coupled to output F, and variable capacitors $C_{1B}$ and $C_{2B}$ share a common node that is coupled to an output E.

Note that in the configurations of FIGS. 7(a) and 7(b), the pairs of exchanged terminals belong to variable capacitors, which are nominally identical (i.e. $C_{1A}=C_{1B}$ and $C_{2A}=C_{2B}$). If the transducer is connected to the readout circuit with its terminals configured in the way shown in FIG. 7(b), instead of FIG. 7(a), the resulting system will be substantially electrically identical to the system in FIG. 4 and will have the same transfer function. The important difference, however, is that the voltage waveform across a particular transducer capacitor ($C_{1A}$, $C_{1B}$, $C_{2A}$, $C_{2B}$) in the configuration of FIG. 7(a) has the opposite polarity from the voltage waveform across the same transducer capacitor in the configuration of FIG. 7(b). In order to obtain zero-average voltage waveforms across the transducer capacitors, the readout circuit of FIG. 4 can be redesigned so that it periodically switches between the transducer configurations of FIG. 7(a) and FIG. 7(b).

Figure 8:
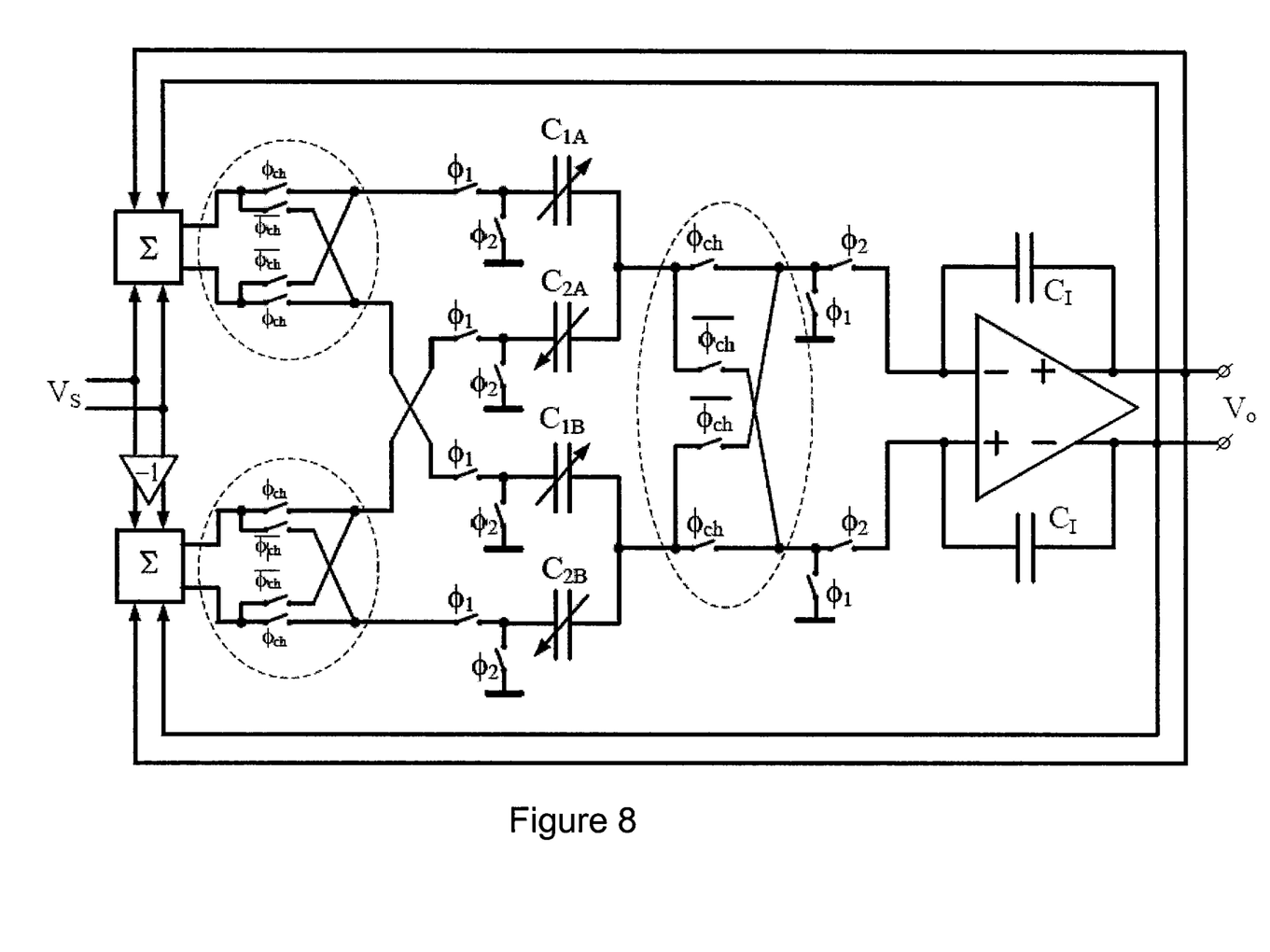
FIG. 8 is a schematic of an exemplary embodiment of a differential self-balancing bridge that can provide substantially zero average voltage across the transducer capacitors.

FIG. 8 shows an exemplary embodiment of a differential self-balancing bridge that can provide substantially zero average voltage across the transducer capacitors. The circuit of FIG. 8 is like the circuit of FIG. 4 except that chopping switches have been added that swap the input and output terminals of the transducer cores $C_A$ and $C_B$. When the chopping clock $\Phi_{ch}$ is in the high state then the transducer terminals are in the configuration shown in FIG. 7(a), and when the chopping clock is in the low state then the transducer terminals are swapped to the configuration shown in FIG. 7(b). Thus, the voltage across a particular transducer capacitor has both positive and negative polarity that switches at the chopping clock frequency which can create substantially zero average voltage on each of the transducer capacitors. By periodically swapping the terminals, for example every other cycle, the transducer capacitors will each experience positive and negative voltages with substantially zero average voltage.

Figure 9:
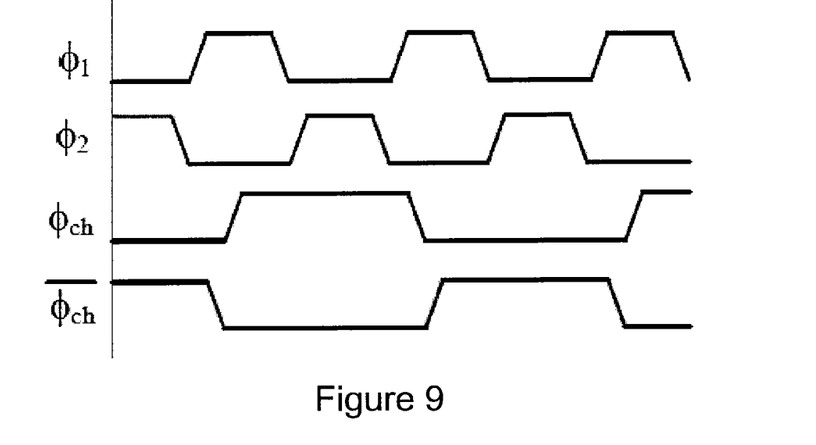
FIG. 9 is an exemplary clocking diagram for the circuit of FIG. 8 to provide substantially zero average voltage across the transducer capacitors.

FIG. 9 shows an exemplary clocking diagram for the circuit of FIG. 8 in which the frequency of the chopping clock $\Phi_{ch}$ (switching or swapping the transducer terminals) is half of the nominal sampling frequency of the main clock. The main clock switches between a charge phase $\Phi_1$ in which charge is gathered by the capacitors and a discharge phase $\Phi_2$ in which charge is discharged by the capacitors through the integrator 412 Other switching frequencies can also be used that will create substantially zero average voltage on the transducer capacitors.

Figure 10:
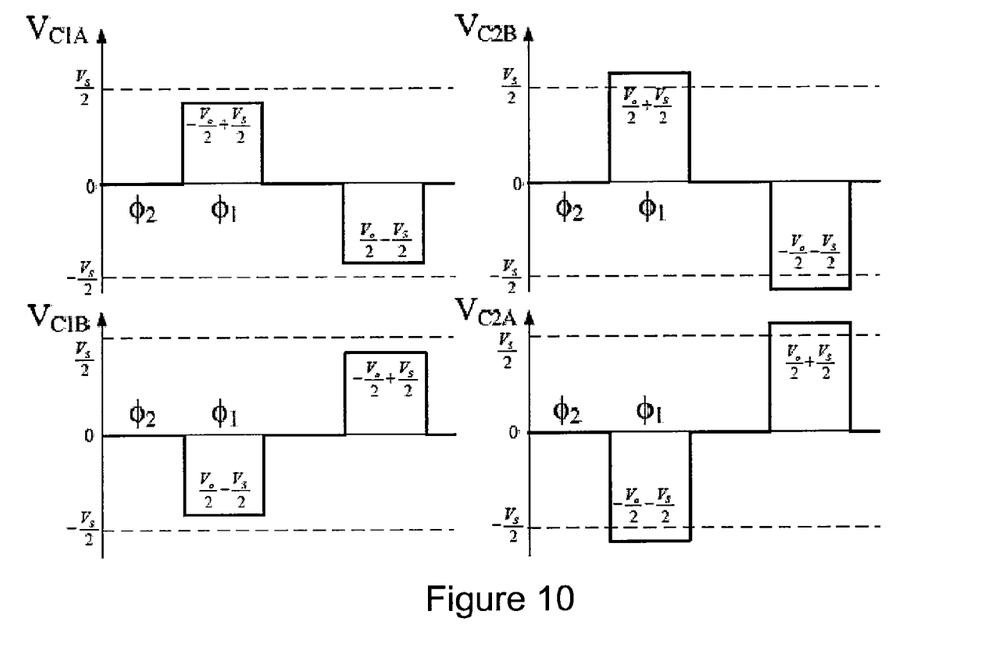
FIG. 10 shows the voltage waveforms across the transducer capacitors of FIG. 8 when using the clocking diagram of FIG. 9.

FIG. 10 shows the voltage waveforms across the transducer capacitors of FIG. 8 when using the clocking diagram of FIG. 9. When the chopping clock $\Phi_{ch}$ is in the high state then the transducer terminals are connected as shown in FIG. 7(a) and the voltages across the transducer capacitors $C_{1A}$, $C_{1B}$, $C_{2A}$ and $C_{2B}$ are the same as shown in FIG. 5, namely $V_{C1A}$ and $V_{C2B}$ have positive polarity and $V_{C1B}$ and $V_{C2A}$ have negative polarity. Then when the chopping clock $\Phi_{ch}$ switches to the low state, the transducer terminals are swapped as shown in FIG. 7(b). This swaps the transducer core terminals so that the voltages across capacitors $C_{1A}$ and $C_{1B}$ are swapped, and the voltages across capacitors $C_{2A}$ and $C_{2B}$ are swapped. It is apparent from FIG. 10 that the average voltage across each of the capacitors $C_{1A}$, $C_{1B}$, $C_{2A}$ and $C_{2B}$ is now zero. This is beneficial in avoiding surface charge build-up on the capacitor terminals which avoids drift in charge.

Figure 11A:
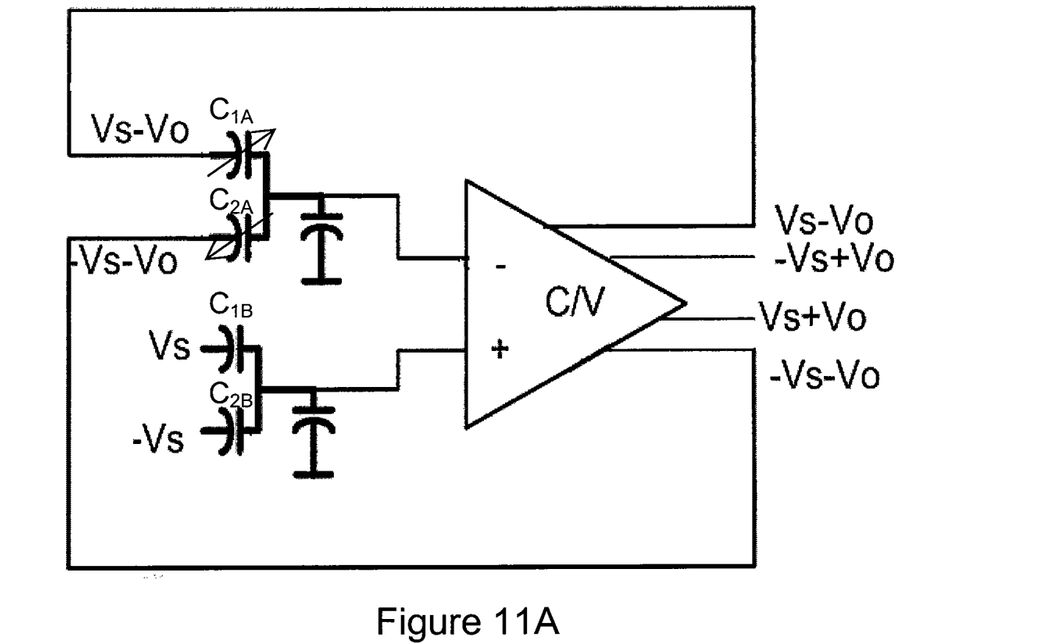
FIG. 11A illustrates an exemplary embodiment of a pseudo-differential bridge that alternates sensor cores and outputs based on a chopping clock to alternate polarity during a low chop state.
Figure 11B:
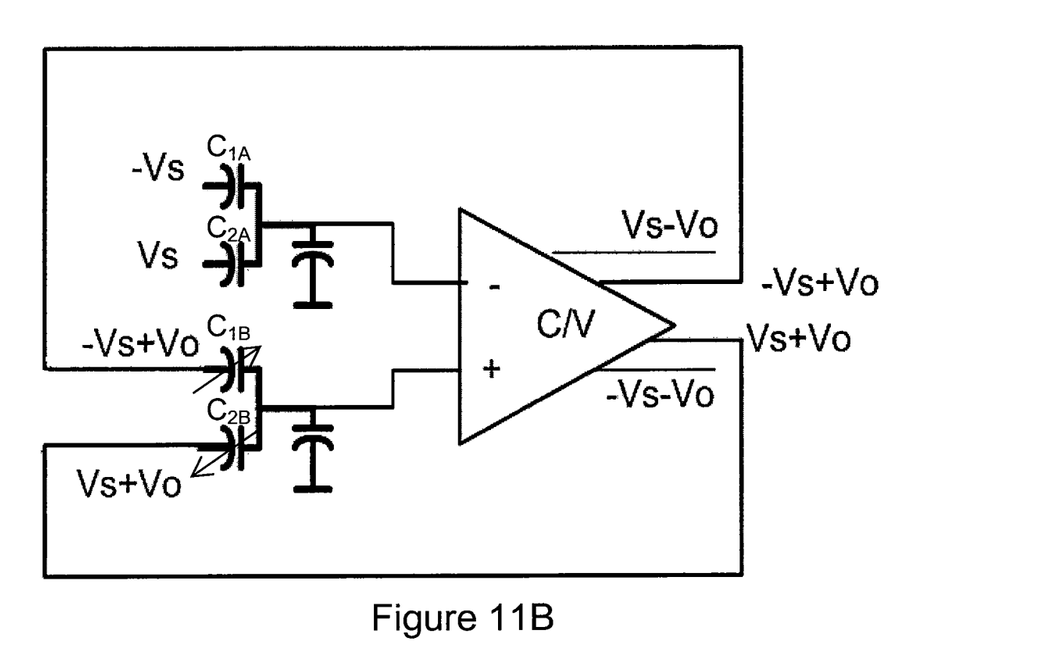
FIG. 11B illustrates the exemplary embodiment of the pseudo-differential bridge of FIG. 11A during a high chop state.

FIGS. 11A and 11B illustrate an exemplary embodiment of a pseudo-differential bridge that alternates transducer cores and outputs based on a chopping clock to alternate polarity on the capacitors which reduces charge build-up and bias. FIG. 11A shows the system during a low chop state and FIG. 11B shows the system during a high chop state. The chopping switches are not shown for simplicity. Only one transducer core, $C_A$ or $C_B$, is receives the fed back output signals during any particular chopping clock phase, and the other transducer core is put in a dummy state.

In the low chop phase, FIG. 11A, core $C_A$ receives the feedback output signals and core $C_B$ is in a dummy state just receiving the reference signal. In this state, variable capacitor $C_{1A}$ receives feedback signal $V_S - V_O$, variable capacitor $C_{2A}$ receives feedback signal $-V_S - V_O$, variable capacitor $C_{1B}$ receives the positive reference voltage $V_S$ and variable capacitor $C_{2B}$ receives the negative reference voltage $-V_S$. The signal input from core $C_A$ is input to the inverting input of the integrator and the dummy input from core $C_B$ is input to the non-inverting input of the integrator.

In the high chop phase, FIG. 11B core $C_B$ receives the feedback output signals and core $C_A$ is in a dummy state receiving the reference signal. In this state, variable capacitor $C_{1B}$ receives feedback signal $-V_S + V_O$, variable capacitor $C_{2B}$ receives feedback signal $V_S + V_O$, variable capacitor $C_{1A}$ receives the negative reference voltage $-V_S$ and variable capacitor $C_{2A}$ receives the positive reference voltage $V_S$. The signal input from core $C_B$ is input to the non-inverting input of the integrator and the dummy input from core $C_A$ is input to the inverting input of the integrator.

Note that as the chopping clock is switched between the high and low phases, the voltage on each of the variable capacitors changes polarity. In the low state, variable capacitors $C_{1A}$ and $C_{1B}$ have a positive voltage and variable capacitors $C_{2A}$ and $C_{2B}$ have a negative voltage. While in the high state, variable capacitors $C_{2A}$ and $C_{2B}$ have a positive voltage and variable capacitors $C_{1A}$ and $C_{1B}$ have a negative voltage. Thus, charge build-up and bias is reduced due to the change in polarity, even though the average voltage is not zero. The sensor core signal is also switched between the inverting and non-inverting inputs of the integrator during the chopping clock phase changes which provides a pseudo-differential effect.

While this invention has been described as having an exemplary design, the present invention may be further modified within the spirit and scope of this disclosure. This application is therefore intended to cover any variations, uses, or adaptations of the invention using its general principles.

We claim:

1. A differential capacitive transducer system that senses a physical quantity, the differential capacitive transducer system comprising:

a first capacitive core generating a first core output based on the physical quantity, the first capacitive core including a first variable capacitor, a second variable capacitor, a first core input coupled to the first variable capacitor, a second core input coupled to the second variable capacitor, and a first core output coupled to a first common node between the first variable capacitor and the second variable capacitor;

a second capacitive core generating a second core output based on the physical quantity, the second capacitive core including a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor;

a chopping system having a high state and a low state, the chopping system being coupled to the first and second capacitive cores, the chopping system having a first chopping input coupled to a first positive signal, a second chopping input coupled to a second negative signal, a third chopping input coupled to a first negative signal, a fourth chopping input coupled to a second positive signal, a first chopping output and a second chopping output, wherein when the chopping system is in the high state, the first chopping input is coupled to the first core input to supply the first positive signal to the first variable capacitor, the second chopping input is coupled to the second core input to supply the second negative signal to the second variable capacitor, the third chopping input is coupled to the third core input to supply the first negative signal to the third variable capacitor, the fourth chopping input is coupled to the fourth core input to supply the second positive signal to the fourth variable capacitor, the first chopping output is coupled to the first core output and the second chopping output is coupled to the second core output; and wherein when the chopping system is in the low state, the first chopping input is coupled to the third core input to supply the first positive signal to the third variable capacitor, the second chopping input is coupled to the fourth core input to supply the second negative signal to the fourth variable capacitor, the third chopping input is coupled to the first core input to supply the first negative signal to the first variable capacitor, the fourth chopping input is coupled to the second core input to supply the second positive signal to the second variable capacitor, the first chopping output is coupled to the second core output and the second chopping output is coupled to the first core output.

2. The differential capacitive transducer system of claim 1, wherein the first positive signal has substantially the same magnitude and the opposite polarity as the first negative signal, and the second negative signal has substantially the same magnitude and the opposite polarity as the second positive signal.

3. The differential capacitive transducer system of claim 1, further comprising an integrator circuit receiving the first and second core outputs and generating a transducer signal.

4. The differential capacitive transducer system of claim 3, further comprising:

a first differential summing circuit summing the transducer signal with a reference voltage and generating the first positive signal and the first negative signal, a second differential summing circuit summing the transducer signal with an inverted reference voltage and generating the second positive signal and the second negative signal, the reference voltage and the inverted reference voltage having substantially the same magnitude and opposite polarity.

5. The differential capacitive transducer system of claim 4, further comprising:
   a first feedback path feeding back the transducer signal to the first differential summing circuit; and
   a second feedback path feeding back the transducer signal to the second differential summing circuit.

6. The differential capacitive transducer system of claim 1, wherein the first variable capacitor and the third variable capacitor react substantially the same to the physical quantity, and the second variable capacitor and the fourth variable capacitor react substantially the same to the physical quantity.

7. The differential capacitive transducer system of claim 1, wherein the first capacitive core comprises a first stationary capacitive plate, a second stationary capacitive plate, a first movable capacitive plate and a second movable capacitive plate; the first movable capacitive plate being coupled to the second movable capacitive plate; the first variable capacitor being formed by the first stationary capacitive plate and the first movable capacitive plate; and the second variable capacitor being formed by the second stationary capacitive plate and the second movable capacitive plate; and
   the second capacitive core comprises a third stationary capacitive plate, a fourth stationary capacitive plate, a third movable capacitive plate and a fourth movable capacitive plate; the third movable capacitive plate being coupled to the fourth movable capacitive plate; the third variable capacitor being formed by the third stationary capacitive plate and the third movable capacitive plate; and the fourth variable capacitor being formed by the fourth stationary capacitive plate and the fourth movable capacitive plate.

8. The differential capacitive transducer system of claim 7, wherein the first movable capacitive plate is coupled to the third movable capacitive plate.

9. The differential capacitive transducer system of claim 1, further comprising a main clock having a main clock frequency and a chopping clock having a chopping clock frequency, the main clock controlling the charging and discharging of the first and second capacitor cores, and the chopping clock controlling when the chopping system is in the high state and the low state.

10. The differential capacitive transducer system of claim 9, wherein the main clock frequency and the chopping clock frequency cause the average voltage over time to be substantially zero volts at each of the first core input, the second core input, the third core input and the fourth core input.

11. The differential capacitive transducer system of claim 9, wherein the main clock frequency is twice the chopping clock frequency.

12. A capacitive transducer system that senses a physical quantity, the differential capacitive transducer system comprising:
   a first capacitive core generating a first core output, the first capacitive core including a first variable capacitor, a second variable capacitor, a first core input coupled to the first variable capacitor, a second core input coupled to the second variable capacitor, and a first core output coupled to a first common node between the first variable capacitor and the second variable capacitor;
   a second capacitive core generating a second core output, the second capacitive core including a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor;
   a chopping system oscillating between a high state and a low state coupled to the first and second capacitive cores, wherein when the chopping system is in the low state, a first high input of the first and second core inputs receives a positive voltage and a first low input of the first and second core inputs receives a negative voltage, the first high input and the first low input being different inputs; and a second high input of the third and fourth core inputs receives a positive voltage and a second low input of the third and fourth core inputs receives a negative voltage, the second high input and the second low input being different inputs; and
   wherein when the chopping system is in the high state, the first high input receives a negative voltage and the first low input receives a positive voltage, the second high input receives a negative voltage and the second low input receives a positive voltage.

13. The capacitive transducer system of claim 12, wherein when the chopping system is in the low state, the first high input and the first low input are coupled to output signals, the output signals being based on the first and second core outputs, the second high input is coupled to a positive reference voltage, and the second low input is coupled to a negative reference voltage, the negative reference voltage having substantially the same magnitude and the opposite polarity as the positive reference voltage; and
   wherein when the chopping system is in the low state, the first high input is coupled to the negative reference voltage, the first low input is coupled to a positive reference voltage, and the second high input and the second low input are coupled to the output signals.

14. The capacitive transducer system of claim 13, further comprising an integrator circuit having an inverting input and a non-inverting input, the integrator circuit generating the output signals; the first core output being coupled to the inverting input of the integrator, and the second core output being coupled to the non-inverting input of the integrator.

15. A differential capacitive transducer system that senses a physical quantity, the differential capacitive transducer system comprising:
   a first capacitive core generating a first core output based on the physical quantity, the first capacitive core including a first variable capacitor, a second variable capacitor, a first core input coupled to the first variable capacitor, a second core input coupled to the second variable capacitor, and a first core output coupled to a first common node between the first variable capacitor and the second variable capacitor;
   a second capacitive core generating a second core output based on the physical quantity, the second capacitive core including a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor;
   a chopping system having a high state and a low state, the chopping system being coupled to the first and second capacitive cores, the chopping system having a first chopping input coupled to a first positive signal, a second chopping input coupled to a second negative signal, a third chopping input coupled to a first negative signal, a fourth chopping input coupled to a second positive signal, a first chopping output and a second chopping output, output circuitry receiving the first and second core outputs and generating a transducer signal;

a main clock having a main clock frequency, the main clock controlling the charging and discharging of the first and second capacitor cores;

a chopping clock having a chopping clock frequency, the chopping clock controlling when the chopping system is in the high state and the low state;

wherein when the chopping system is in the high state, the first chopping input is coupled to the first core input to supply the first positive signal to the first variable capacitor, the second chopping input is coupled to the second core input to supply the second negative signal to the second variable capacitor, the third chopping input is coupled to the third core input to supply the first negative signal to the third variable capacitor, the fourth chopping input is coupled to the fourth core input to supply the second positive signal to the fourth variable capacitor, the first chopping output is coupled to the first core output and the second chopping output is coupled to the second core output; and wherein when the chopping system is in the low state, the first chopping input is coupled to the third core input to supply the first positive signal to the third variable capacitor, the second chopping input is coupled to the fourth core input to supply the second negative signal to the fourth variable capacitor, the third chopping input is coupled to the first core input to supply the first negative signal to the first variable capacitor, the fourth chopping input is coupled to the second core input to supply the second positive signal to the second variable capacitor, the first chopping output is coupled to the second core output and the second chopping output is coupled to the first core output.

16. The differential capacitive transducer system of claim 15, wherein the first positive signal has substantially the same magnitude and the opposite polarity as the first negative signal, and the second negative signal has substantially the same magnitude and the opposite polarity as the second positive signal.

17. The differential capacitive transducer system of claim 16, wherein the main clock frequency and the chopping clock frequency cause the average voltage over time to be substantially zero volts at each of the first core input, the second core input, the third core input and the fourth core input.

18. The differential capacitive transducer system of claim 17, wherein the main clock frequency is twice the chopping clock frequency.

19. The differential capacitive transducer system of claim 15, further comprising:
a first differential summing circuit summing the transducer signal with a reference voltage and generating the first positive signal and the first negative signal, and
a second differential summing circuit summing the transducer signal with an inverted reference voltage and generating the second positive signal and the second negative signal, the reference voltage and the inverted reference voltage having substantially the same magnitude and opposite polarity.

20. The differential capacitive transducer system of claim 15, wherein the first variable capacitor and the third variable capacitor react substantially the same to the physical quantity, and the second variable capacitor and the fourth variable capacitor react substantially the same to the physical quantity.

* * * * *